US010780842B1

United States Patent
Smith

(10) Patent No.: US 10,780,842 B1
(45) Date of Patent: Sep. 22, 2020

(54) SHEET MOUNTING SYSTEM FOR VEHICLES

(71) Applicant: EPIC INTELLECTUAL PROPERTIES, LLC, Las Vegas, NV (US)

(72) Inventor: Marvin A. Smith, Las Vegas, NV (US)

(73) Assignee: EPIC INTELLECTUAL PROPERTIES, LLC, Las Vegas, NV (US)

( * ) Notice: Subject to any disclaimer, the term of this patent is extended or adjusted under 35 U.S.C. 154(b) by 0 days.

(21) Appl. No.: 16/684,923

(22) Filed: Nov. 15, 2019

(51) Int. Cl.
*B60R 13/00* (2006.01)
*B60R 11/00* (2006.01)

(52) U.S. Cl.
CPC .............. *B60R 13/00* (2013.01); *B60R 11/00* (2013.01); *B60R 2011/004* (2013.01)

(58) Field of Classification Search
CPC .... B60R 13/00; B60R 11/00; B60R 2011/004
See application file for complete search history.

(56) References Cited

U.S. PATENT DOCUMENTS

| 5,058,299 | A | * | 10/1991 | Suzuki | ...................... G09F 7/18 160/368.1 |
| 6,164,364 | A | * | 12/2000 | Morris | ................... A47H 23/00 160/327 |
| 6,698,123 | B2 | | 3/2004 | Smith | |
| 6,782,646 | B1 | * | 8/2004 | Devaney | ............. G09F 15/0025 40/590 |
| 6,782,647 | B2 | | 8/2004 | Richards | |
| 6,945,300 | B2 | | 9/2005 | Smith | |
| 7,827,716 | B2 | | 11/2010 | Smith | |

\* cited by examiner

*Primary Examiner* — Lori L Lyjak
(74) *Attorney, Agent, or Firm* — Karish & Bjorgum, PC

(57) ABSTRACT

A mounting system for a sheet on a vehicle includes two elongate rub rails with undercut channels to receive the sheet and tensioning components. The upper rub rail is engaged with one of opposed edges of the sheet. An elongate engagement is engaged with the other opposed edge of the sheet and includes one frame rail and an engagement surface both facing the upper rub rail. An elongate retainer includes a bead engaged with the lower rub rail, another frame rail and parallel retainer surfaces, the second frame rail and the parallel retainer surfaces facing away from the upper rub rail. The engagement surface is movable laterally of the parallel retainer surfaces to be positioned in interlocking engagement with any one of the parallel retainer surfaces to tension the sheet.

2 Claims, 2 Drawing Sheets

US 10,780,842 B1

SHEET MOUNTING SYSTEM FOR VEHICLES

BACKGROUND OF THE INVENTION

The field of the present invention is mounting systems integrated with vehicle components for the attachment of sheets.

Systems have been developed for the mounting of sheets under tension to structures. Advertising and other information is often temporarily presented on large sheets which are placed on billboards, truck panels and the like. One form of such sheet material is tensioned vinyl sheet. Such sheet may be printed upon and surrounded by a more rigid plastic border which is RF welded to the sheet. The border typically includes a large bead, circular in cross section, which operates as a tenon in association with a C-shaped undercut surface forming a mortise associated with a mounting frame. Another border type includes a more structural bead forming a retainer capable of engaging structural elements of the supporting structural frame. Other components associated with the side of vehicles include rub rails. A typical rub rail A having a mounting flange B is illustrated in FIG. 2.

A current system includes mounting for a sheet that has a bead about its periphery. The system includes frame members forming a rectangle with certain of the frame members having mutually parallel multiple engagement surfaces defined on ribs. As one utility, the frame has been mounted on trucks for advertising. The system further includes elongate retainers having elongate flanges with interlocking surfaces that can selectively interlock with any one of the engagement surfaces on the frame members and retainer mortise elements to receive the tenon beads on the periphery of the sheet. Alternatively, the retainer and the bead are integrated into one mechanism for structural engagement with the frame. The frame also has frame rails having rail surfaces that face away from corresponding retainer rail surfaces on the rails of the retainers. A tool including pinch rollers squeezes the corresponding rail surfaces toward one another to place the sheet material held by the retainer in tension while the interlocking surface is engaged with the appropriate engagement surface.

Such systems are disclosed in U.S. Pat. Nos. 6,698,123; 6,782,647; 6,945,300; 7,827,716, the disclosures of which are incorporated herein in their entirety.

SUMMARY OF THE INVENTION

The present invention is directed to a mounting for sheet signage on vehicles. Such signage has a sheet defining a periphery with at least two opposed edges. Elongate supports are arranged to receive opposed edges of the sheet. The supports include integration with elements of the vehicle. One or more rub rails are used to define the support on the vehicles and can actively engage the sheet and tensioning components.

Accordingly, if is an object of the present invention to provide an improved mounting for tensioned sheet on vehicles. Other and further objects and advantages will appear hereinafter.

DETAILED DESCRIPTION OF THE PREFERRED EMBODIMENTS

Figure 1:
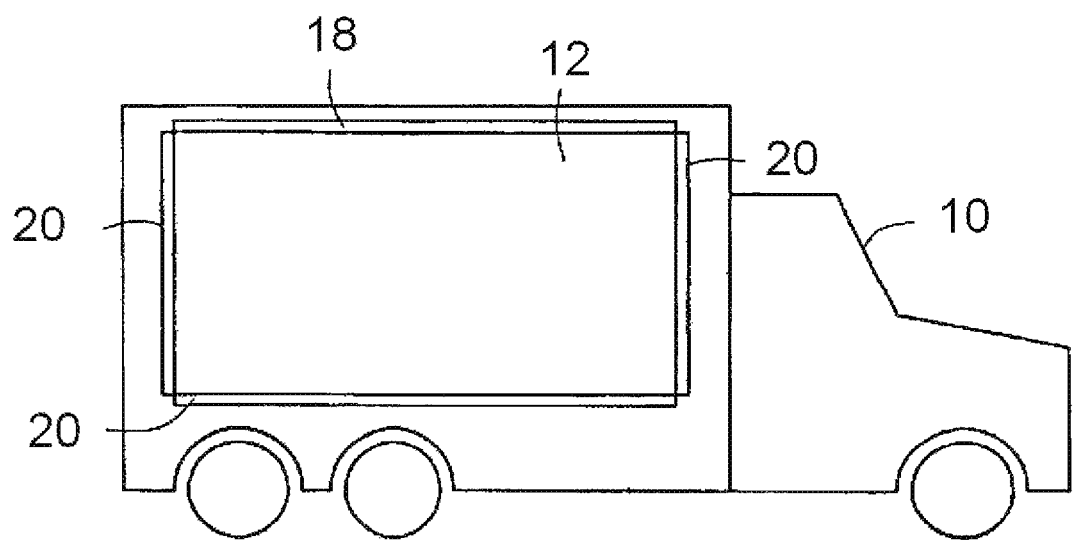
FIG. 1 is a side view if a vehicle with a mounting for sheet signage.
Figure 2:
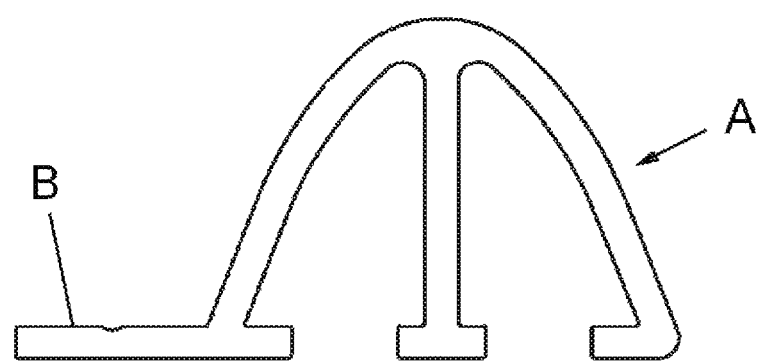
FIG. 2 is an end view of a prior art rub rail.

Turning in detail to the figures, a vehicle 10 is illustrated in FIG. 1 and provides a mounting for a sheet. The mounting is affixed to the side panel of the vehicle 10.

A sheet 12 is mounted to the panel about its periphery. The sheet 12 is contemplated to be vinyl which may be printed upon and tensioned when mounted. The sheet 12 is finished with a peripheral boundary defined by an engaging strip 14 heat welded, sonically welded, sewn, glued or otherwise affixed to the sheet 12. The engaging strip 14 has a peripheral bead 16.

In FIG. 1, there are two sets of opposed attachments, horizontal systems to engage the top and bottom edges of the sheet 12, and vertical systems to engage the side edges of the sheet 12. These two sets are each mutually displaced, parallel engagements. Typically, the top edge of the sheet 12 is engaged by an upper attachment 18 without adjustment while the three remaining edges employ systems 20, which can allow for anchoring and tensioning in the mounting thereof. In this way, a simple capture, typically along the top edge, is accomplished with a fixed mortise. The other edges can then be tensioned to achieve the desired result.

Figure 3:
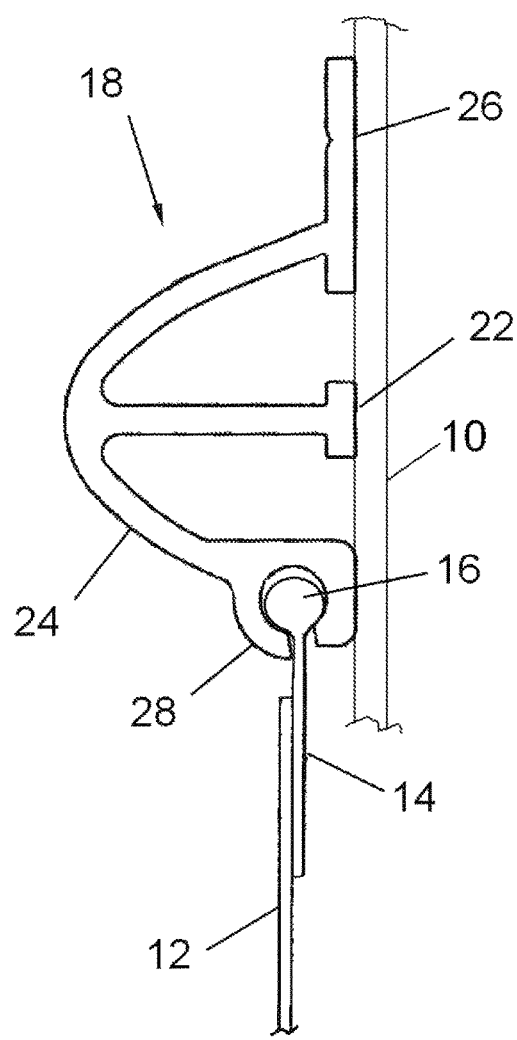
FIG. 3 is an end view of the top portion of a mounting with a sheet.

The elongate upper attachment 18 is shown in FIG. 3. An upper rub rail 22 includes a conventional elongate crown 24 and elongate flange 26. On the other side of the crown 24, an elongate undercut channel 28 defines the fixed mortise to receive the peripheral bead 16 along the upper edge of the sheet 12. The flange 26 is directly mounted to an associated vehicle 10 by fasteners (not shown) in a conventional manner. The upper rub rail 22, as well as all other components of the mounting system, are most conveniently extruded aluminum components cut to appropriate length to attach to the peripheral bead 16 of the sheet 12. The end view of these components as shown in FIGS. 3 and 4 thus defines the entire structure of each.

Figure 4:
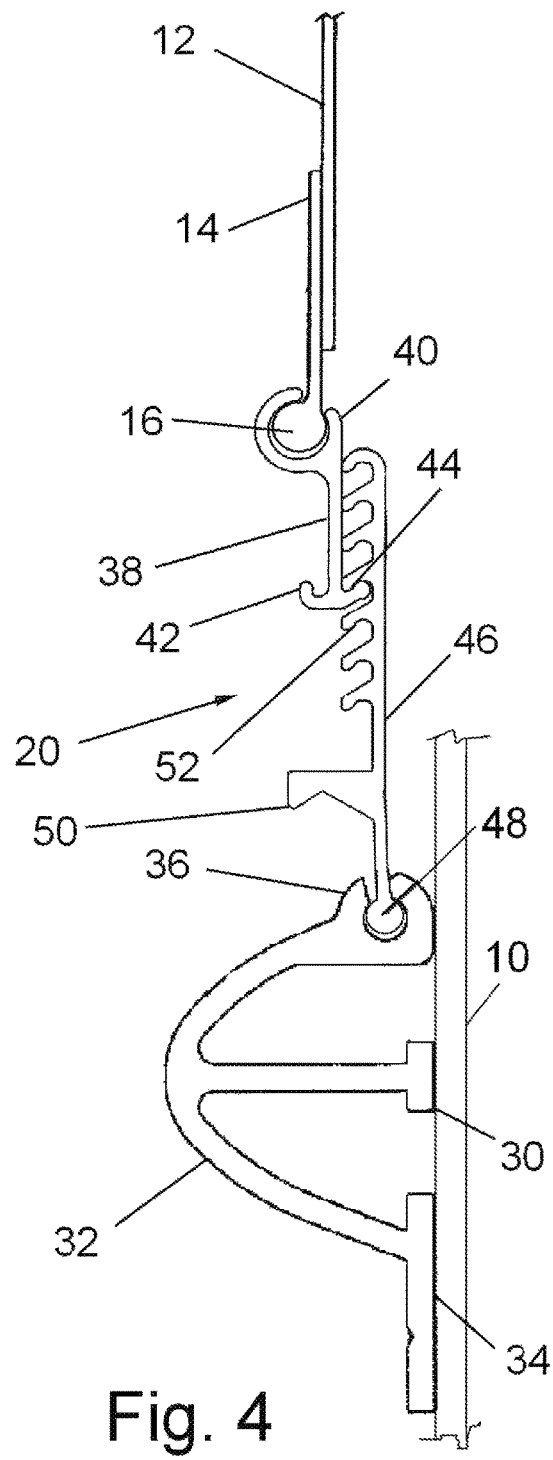
FIG. 4 is an end view of the bottom portion of the mounting of FIG. 3.

The elongate system 20 parallel to and displaced from the elongate upper attachment 18 includes an elongate lower rub rail 30 shown in FIG. 4. The elongate lower rub rail 30 includes a conventional crown 32 and mounting flange 34. On the other side of the crown 32, an undercut channel 36 defines a fixed mortise. The mounting flange 34 is directly mounted to the associated vehicle 10 by fasteners (not shown) in a conventional manner.

The elongate system 20 further includes an elongate engagement 38. This extrusion includes an elongate lower attachment 40. This is defined by an undercut channel forming a fixed mortise to receive the peripheral bead 16 along the lower edge of the sheet 12. The elongate engagement 38 further includes a first elongate frame rail 42 along the length of the elongate engagement 38 facing the elongate upper attachment 18 across the sheet 12. The first elongate frame rail 42 is used to cooperate with a pinch roller, reference can be made to U.S. Pat. No. 6,698,123 for one example, to draw the sheet 12 into vertical tension. The elongate engagement 38 also includes an elongate engagement surface 44. This also faces the elongate upper attachment 18 across the sheet 12.

An elongate retainer 46 is engaged between the elongate rub rail 30 and the elongate engagement 38. The retainer 46 includes an elongate bead 48 to engage with the undercut channel 36 of the elongate rub rail 30. It also includes a second elongate frame rail 50. This frame rail 50 faces away from the elongate upper attachment 18 so as to define parallel and opposed rails 42, 50 to receive the aforementioned pinch roller or other mechanism used to draw the elongate engagement 38 toward the elongate retainer 46 and subsequently tension the sheet 12.

To retain the sheet 12 in tension, the elongate retainer 46 includes parallel retaining surfaces 52. These surfaces 52 also face away from the elongate upper attachment 18 and are opposed to the elongate engagement surface 44. The elongate engagement surface 44, under the influence of the pinch roller with the sheet 12 tensioned, can be moved laterally as the pinch roller moves along the sheet 12 of the parallel retainer surfaces 52 to be positioned in interlocking engagement with any one of the parallel retainer surfaces 52 to tension and retain the sheet 12.

Thus, an improved sheet mounting system for a vehicle has been defined. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A mounting for a sheet on a side of a vehicle, the sheet having a periphery defining at least two opposed edges, comprising
    an elongate rub rail including a crown, a mounting flange along one side of the crown and an undercut channel along another side of the crown, the mounting flange being fixed to the side of the vehicle;
    an elongate upper attachment fixed to the side of the vehicle parallel to and displaced from the elongate rub rail, the elongate upper attachment being engageable with one of the opposed edges of the sheet;
    an elongate engagement including an elongate lower attachment engageable with the sheet along the other of the two opposed edges, a first elongate frame rail along the length of the elongate engagement facing toward the elongate upper attachment and an elongate engagement surface facing toward the elongate upper attachment;
    an elongate retainer including an elongate bead engaged with the undercut channel of the elongate rub rail, a second elongate frame rail along the length of the elongate retainer facing away from the elongate upper attachment and parallel retainer surfaces facing away from the elongate upper attachment, the elongate engagement surface being movable laterally of the parallel retainer surfaces to be positioned in interlocking engagement with any one of the parallel retainer surfaces to tension the sheet.

2. The mounting of claim 1, the elongate upper attachment including a rub rail having a crown, a mounting flange along one side of the crown and an undercut channel along another side of the crown engageable with one of the opposed edges of the sheet.

* * * * *